United States Patent [19]

Artzberger

[11] Patent Number: 4,950,101
[45] Date of Patent: Aug. 21, 1990

[54] SHAFT COUPLING CONSTRUCTION FOR A VIBRATORY SCREED

[75] Inventor: Thomas G. Artzberger, Menomonee Falls, Wis.

[73] Assignee: M-B-W Inc., Slinger, Wis.

[21] Appl. No.: 321,762

[22] Filed: Mar. 10, 1989

[51] Int. Cl.[5] .............................................. E01C 19/38
[52] U.S. Cl. .................................... 404/114; 404/119; 425/452; 403/359
[58] Field of Search .................. 404/96, 114, 118, 119, 404/120; 425/456; 403/359, 300, 301, 306

[56] References Cited

U.S. PATENT DOCUMENTS

| | | | |
|---|---|---|---|
| 4,030,873 | 6/1977 | Morrison | 425/456 |
| 4,131,375 | 12/1978 | Fischer | 403/359 |
| 4,213,749 | 7/1980 | Morrison | 425/456 |
| 4,215,869 | 8/1980 | Pendleton | 403/359 |
| 4,261,694 | 4/1981 | Morrison | 425/456 |
| 4,340,351 | 7/1982 | Owens | 425/456 |
| 4,427,358 | 1/1984 | Stilwell | 425/452 |
| 4,577,994 | 3/1986 | Miller | 404/114 |
| 4,758,114 | 7/1988 | Artzberger | 404/119 |
| 4,832,525 | 5/1989 | Morrison | 404/119 |

Primary Examiner—Jerome W. Massie
Assistant Examiner—Gay Ann Spahn
Attorney, Agent, or Firm—Andrus, Sceales, Starke & Sawall

[57] ABSTRACT

A shaft coupling construction for a vibratory screed. The screed includes at least two vibratory shafts which are disposed in end-to-end relation and an end of each shaft is secured within a bore in a sleeve or connecting member. Each shaft is mounted for eccentric motion to impart vibration to the screed. Each adjacent pair of connecting members are secured together by a flexible tubular coupling, and to transmit rotation between the shafts, the connecting members are provided with external splines which mate with internal splines on the tubular coupling. The spline connection is not symmetrical and is arranged so that the connecting members can be engaged with the tubular coupling only in one circumferential position, thereby insuring that the eccentricity of one shaft is circumferentially aligned with the eccentricity of the other shaft.

15 Claims, 2 Drawing Sheets

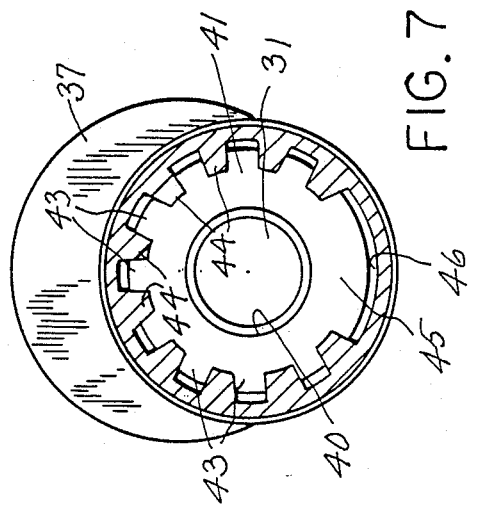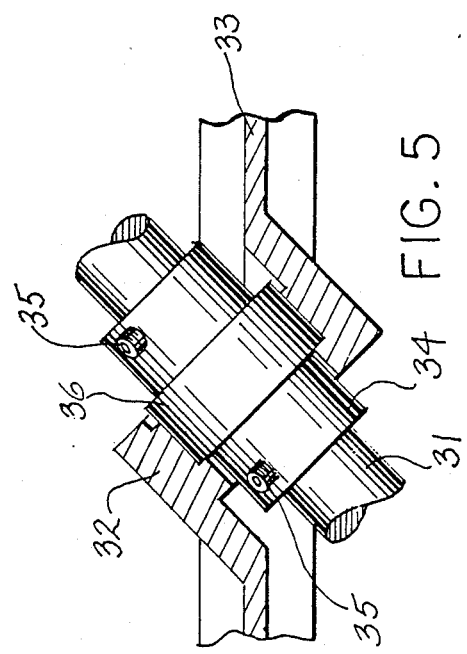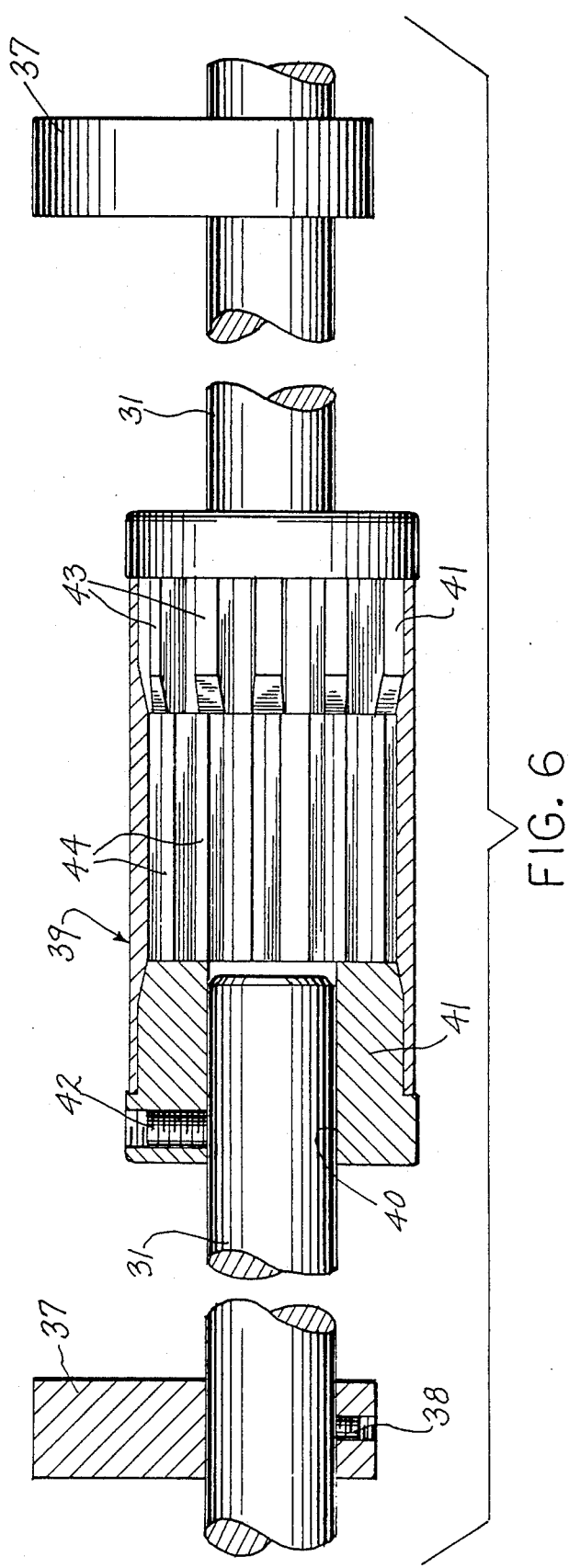

SHAFT COUPLING CONSTRUCTION FOR A VIBRATORY SCREED

BACKGROUND OF THE INVENTION

Vibratory screeds are frequently employed to impart vibrations to poured concrete for tamping and leveling of the concrete as it is finished. The screed eliminates the tedious manual labor involved in finishing the concrete and thereby provides greater productivity as well as improving the quality of the finished concrete slab by providing more accurately controlled slab surfaces as well as controlling the crown.

U.S. Pat. No. 4,758,114 described a screed formed of a plurality of generally triangular frame members which are disposed at an acute angle, preferably about 45°, to the longitudinal axis of the screed. Screed plates are connected to the lower end of each triangular frame member, while the upper apex of each frame member is provided with a cradle that receives a ridge tube.

As disclosed in the aforementioned patent, vibration is imparted to the screed through a power source, such as a gasoline engine, which is mounted on the screed and the drive shaft is operably connected to a vibratory shaft which is journalled within hubs in the bases of the triangular frame members. As disclosed in the patent, the shaft is mounted eccentricly with respect to the hubs and the eccentric mounting provides vibratory motion for the screed.

In practice, the screed may have a substantial length, perhaps up to 50 or 60 feet, and may be composed of a number of screed sections which are connected together to provide the desired length for the concrete slab to be finished. The shaft of each screed section is connected to the shaft of adjacent screed sections by a flexible coupling arrangement. In this coupling construction, the end of each shaft is secured within an eccentric bore in a metal connecting member or sleeve, and a flexible splined tubular coupling connects adjacent sleeves together. More particularly, the outer surface of each sleeve is provided with external splines which mate with internal splines in the flexible coupling. With this construction, the spline connection transmits rotation between the shafts of the screed sections.

It is necessary that the eccentricity of the shafts be aligned, otherwise the harmonics will be upset and consistent vibrations will not be obtained throughout the length of the screed. If the eccentricity of the shafts is not in alignment, the vibrations will be either partially or fully cancelled and increased stress will be imparted to the shaft bearings and the structural components of the screed frame.

It has been found that it is extremely difficult in the field to properly align the eccentricity of the shafts. Attempts have been made to mark the sleeves to indicate the location of eccentricity and the workman in the field is then required to align the marks as the sleeves are inserted within the ends of the flexible coupling. This system has not proved satisfactory because the marks tend to become obliterated and workmen may not be fully apprised of the purpose of the marks with the result that the eccentricity of the shafts is not properly aligned and the vibrations are cancelled out and not maximized.

SUMMARY OF THE INVENTION

The invention is directed to a coupling construction for connecting the adjacent ends of a vibratory drive shaft for a screed which insures that the eccentricity of the shafts is properly aligned. In one form of the invention, the end of each shaft is secured within an eccentric bore in sleeve or connecting member and adjacent sleeves are connected in end-to-end relation by a flexible tubular coupling. To transmit rotation between the sleeves, the external surface of each sleeve is provided with a plurality of splines which are engaged with internal splines on the tubular coupling.

The spline connection is not symmetrical and is constructed and arranged so that the sleeves can be inserted within the tubular coupling in only one circumferential position, thereby insuring that the eccentricity of one shaft is properly aligned with the eccentricity of the adjacent shaft.

In a preferred form of the invention, one of the external splines on each sleeve is provided with a greater circumferential dimension than the remainder of the splines and is engageable with a single internal spline in the flexible coupling which has the same circumferential dimension. As the enlarged external spline on both sleeves have the same orientation with respect to the eccentricity the engagement of the flexible coupling will ensure that the eccentricity of the sleeves and shafts are properly aligned. With proper alignment of the eccentricity, the maximum amplitude of virbration is achieved and stress on the shaft bearings, as well as the frame components of the screed, are reduced.

In a second form of the invention, the end of each shaft is mounted concentrically of a sleeve or connecting member and the vibratory motion is provided by securing a weight in an eccentric manner to each shaft. The adjacent sleeves are connection in an end-to-end relation by a flexible, splined, tubular coupling. As in the case of the first embodiment, the spline connection is not symmetrical and is designed so that the sleeves can be engaged with the tubular coupling only in the circumferential position, thus insuring that the eccentric weight of one shaft is aligned with the eccentric weight of the second shaft.

The coupling construction is foolproof in that it is only engageable in a single position and thus eliminates the need for instructing workmen as to the aligning procedure.

Other objects and advantages will appear in the course of the following description.

DESCRIPTION OF THE DRAWINGS

The drawings illustrate the best mode presently contemplated of carrying out the invention.

In the drawings:

FIG. 5 is a fragmentary horizontal section of a frame member of a modified form of the screed and showing the concentric mounting of a shaft to the frame member;

FIG. 6 is a longitudinal section of the shaft coupling construction of FIG. 5; and FIG. 7 is a transverse section taken along line 7—7 of FIG. 6.

DESCRIPTION OF THE ILLUSTRATED EMBODIMENT

Figure 1:
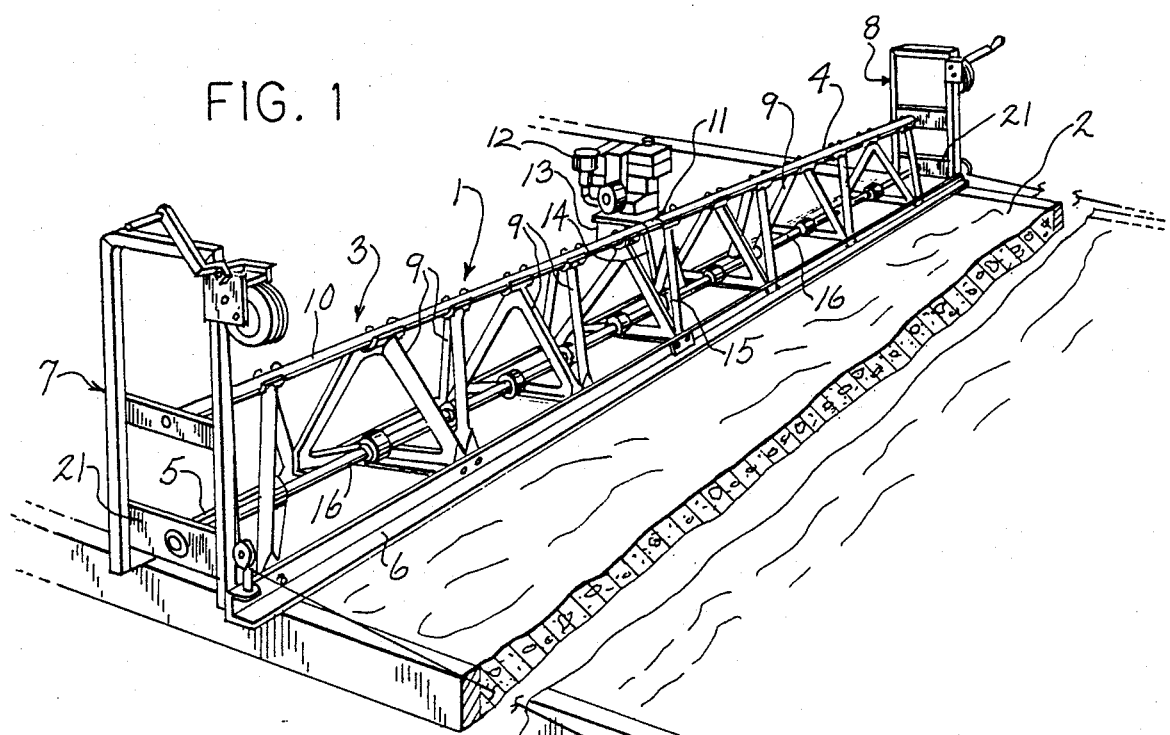
FIG. 1 is a perspective view of a vibratory screed incorporating the drive shaft coupling construction of the invention.
Figure 2:
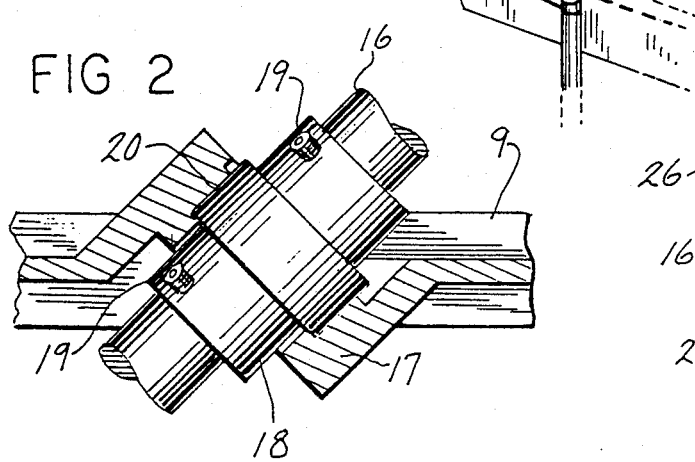
FIG. 2 is a fragmentory horizontal section of a frame member showing the hub.

FIG. 1 illustrates a typical screed as used to finish a slab 2 of concrete and can be constructed in accordance with the teachings of U.S. Pat. No. 4,758,114.

Screed 1 is composed of a series of sections which are disposed in end-to-end relation, and while FIG. 1 shows two sections 3 and 4 it is contemplated that a plurality of sections can be utilized depending upon the dimensions of the slab to be finished.

Each section 3, 4 includes a pair of angle screed plates or rails 5 and 6. Screed plates 5 and 6 of section 3 are connected by a generally rectangular end frame 7, while the corresponding ends of screed plates 5 and 6 of section 4 are connected by a similar end frame 8.

Each screed section 3, 4 includes a plurality of generally triangular frame members 9 which are connected to screed plates 5 and 6. Frame members 9 are located in an acute angle, preferable about 45°, with respect to the longitudinal dimension of the screed and each frame member is positioned at an angle of about 90° with respect to adjacent frame members, as disclosed in U.S. Pat. No. 4,758,114.

The apex of each frame member 9 is provided with a generally semi-cylindrical cradle and a ridge tube 10 is secured to the cradle. The ridge tubes 10 of sections 3 and 4 are connected together by an adjustable ridge tube connector, indicated generally by 11.

To impart vibratory motion to the screed a gasoline engine 12 is supported by a support bracket 13 from one of the ridge tubes 10 and the output shaft of the engine is connected through a drive belt 14 to a pulley 15 mounted on shaft 16 of frame section 3. Frame section 4 includes a similar shaft 16 which is adapted to be connected to the shaft 16 of section 3 as will be hereinafter described.

Each shaft 16 is journalled within a hub 17 in the base of each frame member 9. Shaft 16 is mounted within an eccentric opening in sleeve 18 by set screw 19. Sleeve 18 in turn is journalled for rotation within a bearing 20 that is mounted in an opening in hub 17. Due to the eccentric mounting of the shaft relative to the bearing 20 vibration will be imparted to the frame sections 3, 4.

Figure 4:
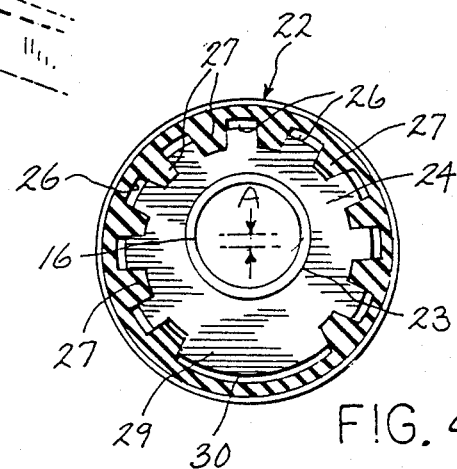
FIG. 4 is a section taken along line 4—4 of FIG. 3.
Figure 3:
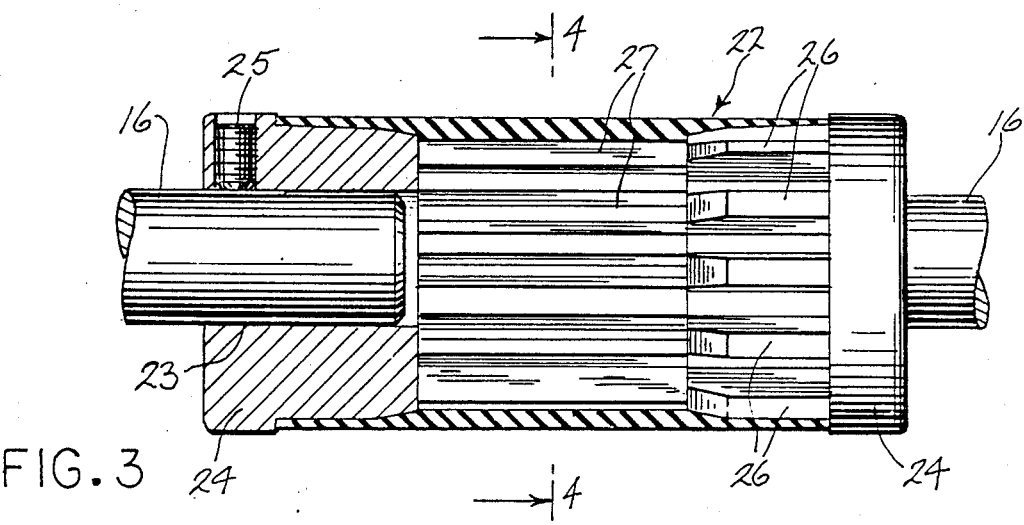
FIG. 3 is a longitudinal section of the shaft coupling construction.

Adjacent ends of shafts 16 are connected by a flexible rubber-like coupling 22. As best shown in FIGS. 3 and 4, the end of each shaft 16 is secured within an eccentric bore 23 in a metal sleeve or connector 24. As seen in FIG. 4, the axis of bore 23 is offset from the axis of sleeve 24. The end of the shaft is secured within the bore by set screw 25, or other connector.

Each sleeve 23 is provided with a plurality of external longitudinal splines 26, and as shown in FIG. 3, the outer ends of the splines are tapered inwardly to facilitate insertion of the sleeve within the end of the flexible coupling 22.

Coupling 22 is provided with a plurality of internal longitudinal splines 27 which mate with the external splines 26 on the sleeves 23. The spline connection serves to transmit rotation from the shaft 16 of section 3 to shaft 16 of section 4.

The splines 26, 28 are not symmetrical and are arranged so that the sleeves 23 can be inserted into the ends of the coupling 22 only in one circumferential position, thus insuring that the eccentricity of one shaft 16 is aligned with the eccentricity of the other shaft. To provide this construction, one of the external splines on each sleeve 23 is enlarged circumferentially as indicated by 29. Similarly, the flexible coupling 22 is provided with an enlarged internal groove 30 which mates with the enlarged splines 29 of sleeves 23. The indexing splines 29 on both sleeves 23 are located in the same relation or orientation with respect to the eccentricity of the sleeves. For example, as shown in FIG. 4, the axis of bore 23 is offset from the axis of the sleeve by a distance A and the large indexing spline 29 is located diametrically opposite the eccentricity. This condition exists in both of the sleeves 23. Thus the engagement of the sleeves 23 within the coupling 22 will ensure that the eccentricity of one shaft is precisely aligned with the eccentricity of the second shaft, thereby ensuring that the maximum amplitude of vibration is achieved throughout the length of the screed.

The coupling construction of the invention is foolproof in that the coupling can only be connected to the sleeves 23 in one circumferential position. Not only does this ensure precise alignment, but eliminates the need for instructing workmen as to the aligning procedure.

FIGS. 5–7 illustrate a modified form of the invention. Each screed section 3, 4 includes a shaft 31 and one of the shafts can be driven by a gasoline engine mounted on the screed, as previously described. As seen in FIG. 5, each shaft 31 is journalled in the hub 32 of a generally triangular frame member 33, similar in construction to frame members 9, previously described. More specifically, each shaft 31 is mounted concentrically within a sleeve 34 by one or more set screws 35 and sleeve 34, in turn, is journalled for rotation within a bearing 36 that is mounted within an opening in hub 32.

To provide vibratory motion for the screed, a weight 37 is mounted in an offset or eccentric manner on each shaft 31. As best shown in FIG. 7, each weight 37, can be connected to the shaft through a set screw 38, or alternately, a pin can be inserted through aligned openings in the weight and the shaft. The eccentric relationship of the weights 34 provides the shafts with vibratory motion.

Adjacent ends of shafts 31 are connected by a flexible rubber-like splined coupling 39, which is similar in function and construction to coupling 22, previously described. The end of each shaft 31 is secured within a concentric bore 40 in a metal sleeve or connector 41 by a set screw 42, or other connector. Each sleeve 41 is provided with a plurality of external longitudinal splines 43 and the outer ends of the splines are tapered inwardly to facilitate the insertion of the sleeve within an end of the flexible coupling 39.

Flexible coupling 39 is formed with a plurality of internal longitudinal splines 44, which mate with the external splines 43 on sleeve 41. The spline connection serves to transmit rotation from one of the shafts 31 to the other.

Splines 43, 44 are not symmetrical and are designed so that the sleeves 41 can be inserted into the ends of the coupling 39 only in one circumferential position. As in the case of the first embodiment, this relationship can be provided by enlarging one of the external splines 43 on each sleeve circumferentially, as indicated by 45. Similarly, coupling 39 is provided with an enlarged internal groove 46 which mates with the enlarged splines 45 of sleeves 41. The indexing splines 45 on both of the sleeves 41 are located in the same relation or orientation with respect to the eccentricity of the weights 36. As shown in FIG. 7, this orientation can be achieved by positioning the indexing splines 45 diametrically opposite the eccentricity of the weights 37. This condition exists in both of the sleeves 41. Thus, the engagement of the sleeves 41 with coupling 39 will ensure that the eccentricity of the weight 37 on one shaft is aligned with the eccentricity of the weight 37 on the second shaft.

At the factory, or other place of manufacture, the sleeves 41 are connected to the ends of the shaft 31, such that the eccentricity of weights 37 is in the same orientation as the indexing spline 45. In the field, the shafts 31 can be attached to coupling 39 only in one circumferential position, thus ensuring that the eccentricity of the shafts is aligned and preventing the vibratory forces in one shaft from cancelling the vibratory forces in the other shaft.

Various modes of carrying out the invention are contemplated as being within the scope of the following claims particularly pointing out and distinctly claiming the subject matter which is regarded as the invention.

I claim:

1. In a vibratory screed construction, a pair of shafts disposed in end-to-end relation, eccentric means associated with each shaft for imparting eccentric motion to each shaft to thereby vibrate the screed, a flexible tubular open ended coupling means for connecting adjacent ends of said shaft and transmitting rotation therebetween, and locating means interconnecting said shafts and said coupling means for aligning the eccentric means of one shaft with the eccentric means of the other shaft, said locating means being constructed and arranged such that each shaft can be connected to said coupling means in only one circumferential position.

2. The construction of claims 1, wherein each shaft includes a shaft member and a sleeve member having a bore to receive the end of each shaft member, said locating means interconnecting said sleeve members and said coupling means.

3. The construction of claim 1, wherein said eccentric means comprises a weight secured in eccentric relation to each shaft.

4. The construction of claim 2, wherein each sleeve member is provided with a plurality of external splines and said coupling means has a plurality of mating internal splines.

5. The construction of claim 4, wherein one of said splines on said sleeve member has a greater circumferential dimension than the remainder of the splines on said sleeve member, and said coupling means has a groove between adjacent splines constructed to receive said one spline.

6. In a vibratory screed construction, a pair of shafts disclosed in end-to-end relation, a sleeve having a bore to receive the end of each shaft, eccentric means associated with each shaft for imparting eccentric motion to each shaft to thereby vibrate the screed, a flexible tubular open ended coupling connecting said sleeves, and a spline connection interconnecting said sleeves and said coupling, said spline connection being constructed and arranged so that the sleeves can be engaged with said coupling only when the eccentric means of one shaft is aligned with the eccentric means of the other shaft.

7. In a screed, frame means, a pair of shafts journalled for eccentric rotation with respect to said frame means, the ends of said shafts being disposed in adjacent end-to-end relation, and a coupling assembly for connecting the ends of said shafts, said coupling assembly including a pair of connecting members each having a bore to receive the end of a shaft, and a flexible tubular coupling having a longitudinal opening to receive the connecting members, each connecting member having at least one external longitudinal spline element and the coupling having at least one internal longitudinal spline element to receive said external spline elements, said external and internal spline elements being constructed and arranged so that said connecting members can be inserted in the ends of said coupling only in one circumferentially oriented position in which the eccentricity of one shaft is aligned with the eccentricity of the other shaft.

8. The screed of claim 7, in which said coupling is formed of rubber-like material.

9. In a screed, frame means, a pair of shafts each mounted for eccentric rotation relative to said frame means, drive means operably connected to one of said shafts for driving said shaft, and a coupling assembly for connecting the shafts in end-to-end relation, said coupling assembly including a pair of connecting members each having an eccentric bore to receive an end of a shaft, and a tubular flexible coupling having a longitudinal passage therethrough, said connecting members being disposed within the opposite ends of said passage, and means for aligning a plane passing through the axis of a first of said connecting members and the axis of the bore therein in co-planar relationship with a plane passing through the axis of the second of said connecting members and the axis of the bore therein.

10. The screed of claim 9, wherein said means for aligning comprises mating longitudinally extending spline elements on the outer surface of said connecting members and on the inner surface of said coupling.

11. The construction of claim 9, wherein said eccentric means comprises a weight eccentrically attached to each shaft.

12. The construction of claim 9, wherein said eccentric means comprises an eccentric bore in each sleeve to receive the end of a shaft.

13. In a vibratory screed construction, a pair of shafts disposed in end-to-end relation, eccentric means associated with each shaft for imparting eccentric motion to each shaft to thereby vibrate the screed, flexible tubular open-ended coupling means for connecting adjacent ends of said shaft and transmitting rotation therebetween, said shaft including a shaft member and a sleeve member having an eccentric bore to receive the end of each shaft member, and locating means interconnecting said sleeve members and said coupling means for aligning the eccentric means of one shaft with the eccentric means of the other shaft.

14. The construction of claim 13, wherein said locating means includes a first longitudinally extending spline element on the interior of said coupling means and a second longitudinal extending spline element on the exterior of each sleeve member and disposed to engage said first element, the second spline elements on both of said sleeve members having the same circumferential orientation with relation to the eccentric means of the respective shaft, said elements being constructed and arranged so that each sleeve member is insertable in the respective end of said coupling means only when said second elements are in aligned relationship.

15. The construction of claim 14, wherein the axis of the bore in each sleeve member is offset in one radial direction from the axis of the sleeve member and said second spline element in each sleeve member is disposed in the opposed radial direction from the axis of the sleeve member.

* * * * *